United States Patent

Rouyrre et al.

[11] Patent Number: 5,841,119
[45] Date of Patent: Nov. 24, 1998

[54] SMART TOOL FOR COMMUNICATION AND AN APPLIANCE MAKING USE THEREOF

[76] Inventors: Olivier Rouyrre, 13 rue de Bruxelles, 75009 Paris; Patrick Labbe', 14 rue Exelmans, 78140 Velizy, both of France

[21] Appl. No.: 647,908
[22] PCT Filed: Jan. 20, 1995
[86] PCT No.: PCT/FR95/00062
  § 371 Date: May 30, 1996
  § 102(e) Date: May 30, 1996
[87] PCT Pub. No.: WO95/21421
  PCT Pub. Date: Aug. 10, 1995

[30] Foreign Application Priority Data

Feb. 2, 1994 [FR] France .................................. 94 01128

[51] Int. Cl.⁶ .................................................. G06K 9/05
[52] U.S. Cl. .......................................... 235/380; 235/492
[58] Field of Search .................................... 235/379, 380, 235/492

[56] References Cited

U.S. PATENT DOCUMENTS

| | | | |
|---|---|---|---|
| 4,277,837 | 7/1981 | Stuckert | 235/379 |
| 4,305,059 | 12/1981 | Benton | 235/379 |
| 4,454,414 | 6/1984 | Benton | 235/379 |
| 4,625,276 | 11/1986 | Benton et al. | 235/379 |
| 5,339,239 | 8/1994 | Manabe et al. | 235/375 |
| 5,434,395 | 7/1995 | Storck et al. | 235/379 |
| 5,453,601 | 9/1995 | Rosen | 235/379 |
| 5,572,572 | 11/1996 | Kawan et al. | 379/98 |

FOREIGN PATENT DOCUMENTS

| | | |
|---|---|---|
| 0057602 | 8/1982 | European Pat. Off. . |
| 0168836 | 1/1986 | European Pat. Off. . |
| 0362050 | 4/1990 | European Pat. Off. . |
| 2611948 | 9/1988 | France . |
| 8102070 | 7/1981 | WIPO . |

*Primary Examiner*—Donald T. Hajec
*Assistant Examiner*—Mark Tremblay
*Attorney, Agent, or Firm*—Bush Riddle & Jackson, LLP

[57] ABSTRACT

The card (40) is a plate in the form of a bank card which is provided with a power source, a microcontroller (144), a personal data memory (254), an acquired data memory (256), and a data-in-transit memory (212). Each card possesses two coupling members, i.e. a transmitter and a receiver on each of its faces, together with two manual activators (42–52) adapted to put it into operation. An operation of interchanging data between a plurality of cards (40.1, . . . , 40.4) comprises an initial step of checking feasibility in which a down stage during which the personal data in each card is accumulated (arrows 41.1, 41.2, 41.3) in the data-in-transit memories (212) of the cards disposed there beneath, and the other stage being an up stage symmetrical to the preceding stage. The end of this second stage triggers a down procedure in which the acquired data memories (256) are loaded. The last card in the stack issues an audible signal (58) to indicate that the operation has finished successfully. The card may be inserted in the appliance for making use thereof which is itself connectable to an external microcomputer, in order to display or process the acquired data, to modify the stored personal data, to enable or disable interchange thereof, or to apply a particular applications program thereto. Applications include intelligent calling cards and multipurpose cards.

5 Claims, 10 Drawing Sheets

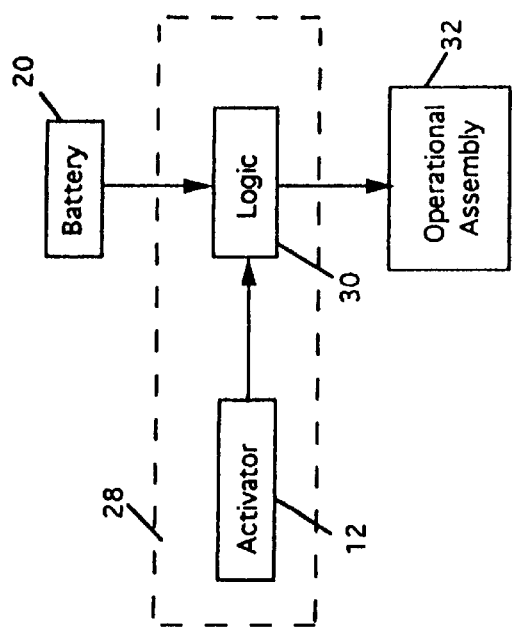
Fig 2
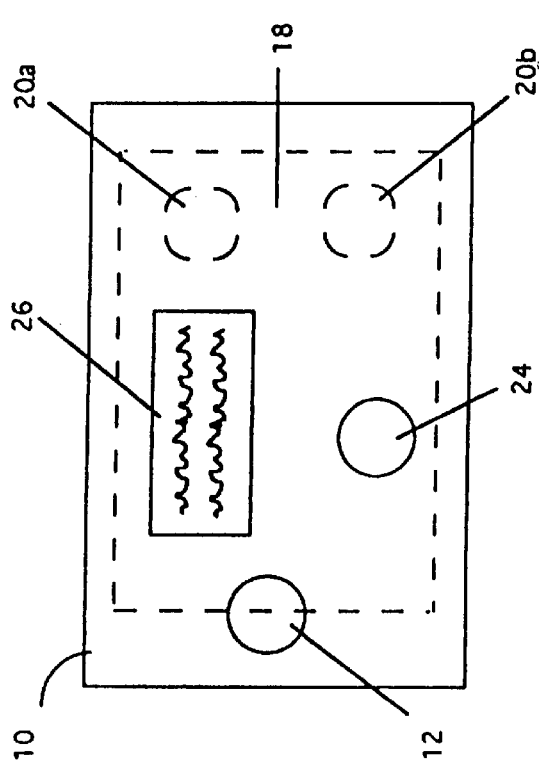
Fig1.a
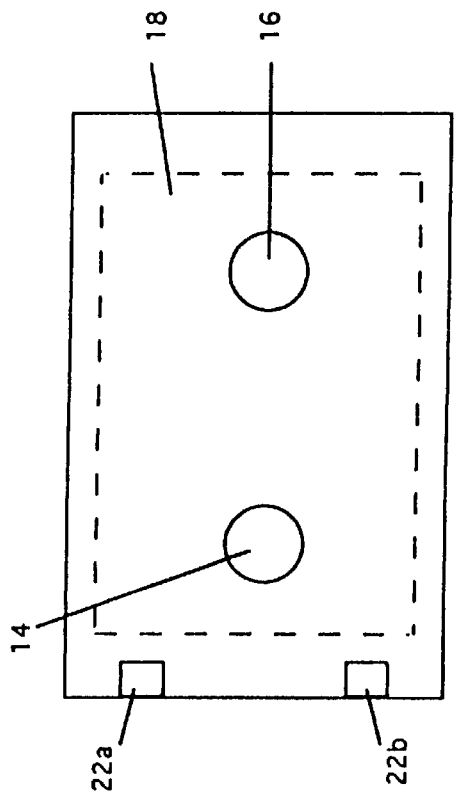
Fig1.b
Fig 1

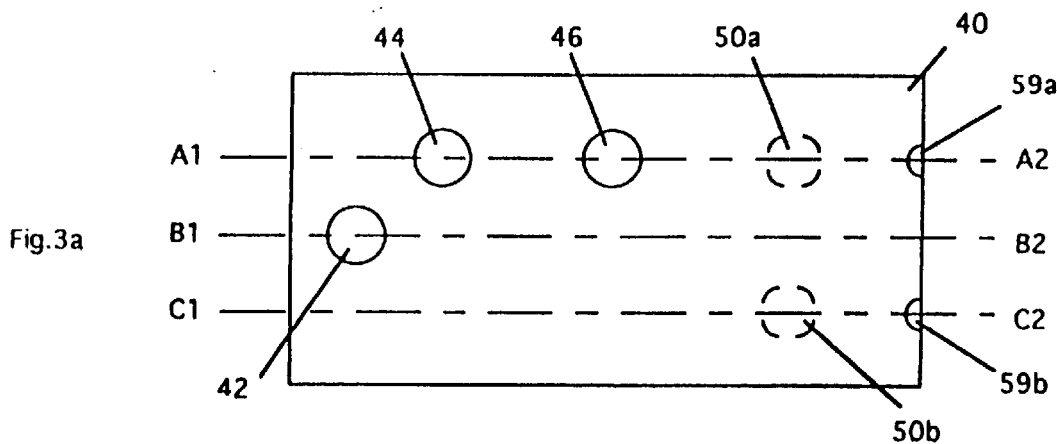
Fig.3a
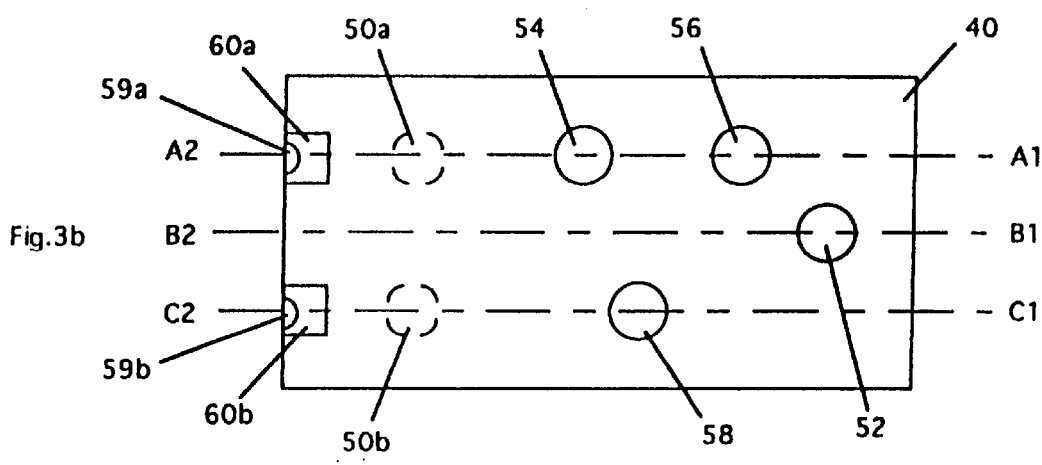
Fig.3b
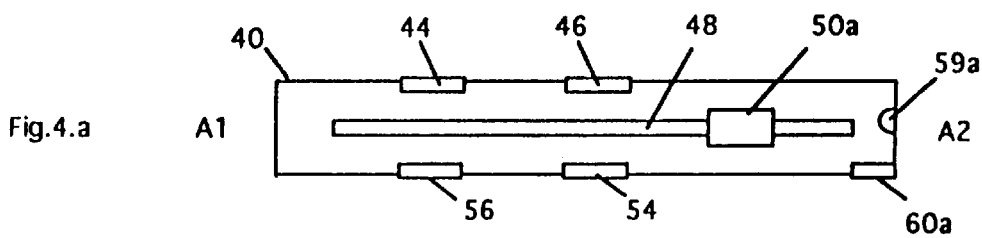
Fig.4.a
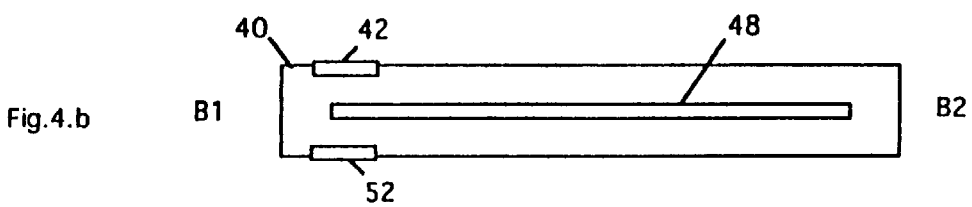
Fig.4.b
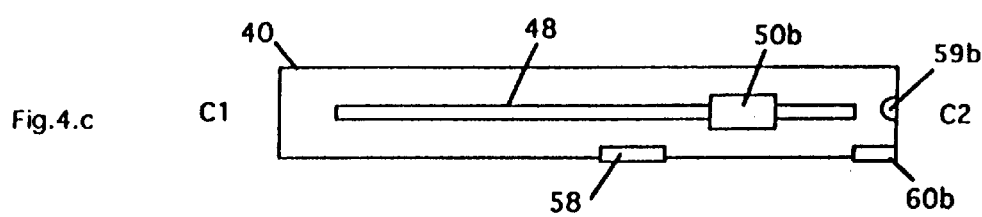
Fig.4.c

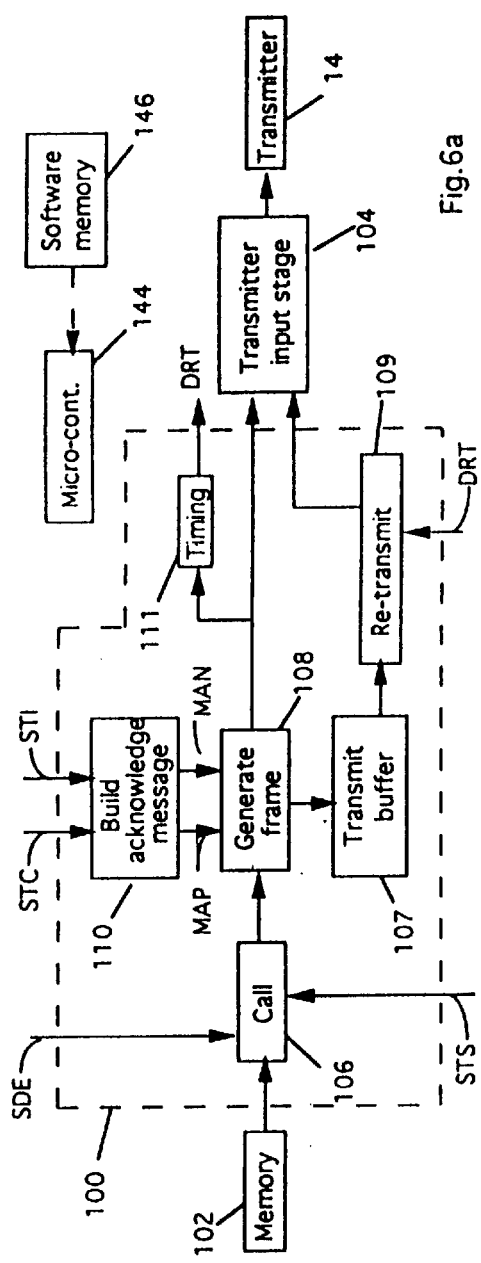
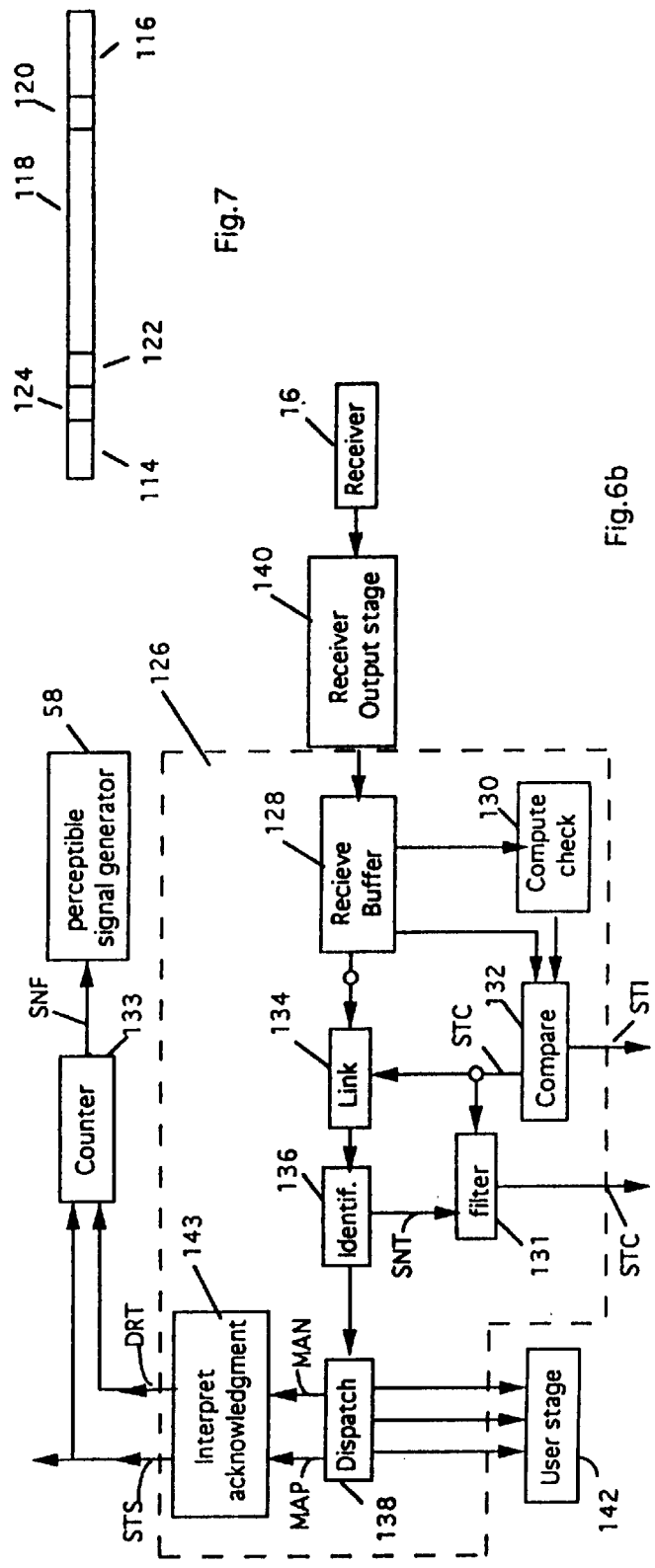

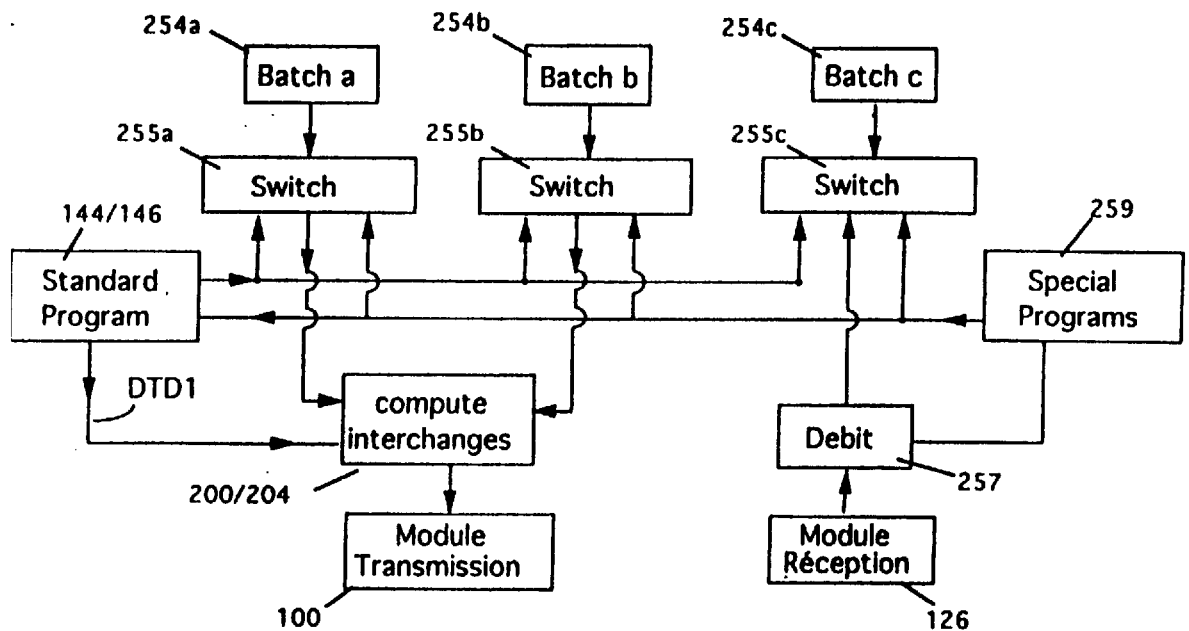
Fig. 15a (TOOL)
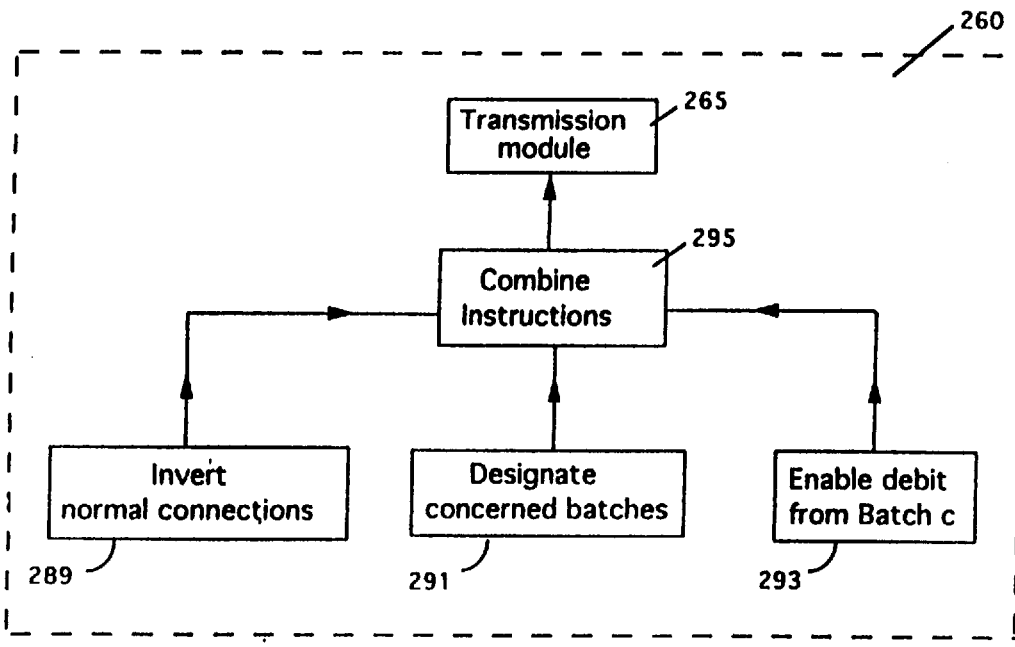
Fig. 15b (APPLIANCE FOR USING TOOL)

SMART TOOL FOR COMMUNICATION AND AN APPLIANCE MAKING USE THEREOF

BACKGROUND OF THE INVENTION

1. Field of the Invention

The invention relates to a smart card for communication and to an appliance for making use of the card. The system serves both to provide direct communication between individuals each possessing such a card and, where appropriate, communication between the card and computer systems adapted to perform determined special functions.

Smart cards for interchanging information between an individual and a machine are well known. They are cards having electronic chips which are widely used in numerous applications and in compliance with an international standard (ISO 7810).

A bank card can be used in particular to withdraw money from a bank note dispenser (ATM) or to pay a trader having an electronic paying-in machine, both of which operations lead subsequently to the bank account of the card holder being debited. Other examples of smart cards enabling an individual to transfer prepurchased money data to a creditor by means of a machine include phone cards used in pay phones and also the payment card intended for wider use as announced in the specialized press (Electronic Purse), or the card that gives access to a TV pay channel. In all of those applications, the chip-containing card concerned has a minimal number of components (a microcontroller and a memory), it being understood that the powerful computer system in which it is incorporated while it is actually in use provides it with all of the additional means (including electrical power and appropriate operating and applications software) required to carry through all of the operations that need to be performed.

2. Description of the Prior Art

Those known types of smart cards present various technical drawbacks that we have attempted to correct.

Thus, OKI's European patent application EP 0 168 836 describes a smart card of the bank card type comprising a power supply, a microprocessor, memories, a two-key keypad, a display screen, and an optical signal transceiver pair. Such a card operates under the control of special control software. This makes it possible for the user to consult the contents of the card directly without relying on the usual kind of appliance for operating therewith. That card does not enable data to be interchanged between individuals.

FUJITSU's European patent application EP 0 362 050 describes a memory cards suitable for communicating with a plurality of read and write appliances including a data bus that operates with different word lengths. To this end, that card includes substantially the same electronic components as the preceding card, with the entire system operating under the control of appropriate control software. That type of card is naturally incapable of performing direct data interchange between individuals.

CHALMERS' European patent EP 0 057 602 describes a standard smart card capable of possessing a plurality of different functions. Each pre-programmed function is performed when the card is connected to the corresponding computer system. To this end, it comprises substantially the same electronic components as the two above-mentioned cards together with special control software adapted to switch between functions and to perform them. The transmitter and receiver members are of the inductive type. That card does not enable data to be interchanged directly between individuals.

A solution to the problem of transferring money data between two individuals is proposed in French patent No. 90/05562 which describes a pocket computer appliance having a power supply, a programmed microcontroller, a display screen, and a keypad. That appliance is adapted to serve as an interface between two compatible smart cards, in order to proceed with data transfer and/or interchange between the cards. Under such circumstances, the number of components in the card is minimal and the computer appliance in question constitutes an essential intermediary to enable any use whatsoever to be made of the data contained in a card. In certain new applications for chip-containing cards, the necessary intervention of such an intermediary constitutes an impediment to further development of such applications, and it would be advantageous to eliminate that impediment.

Another solution to the same problem is proposed in BENTON's international patent application WO 81/02070 which describes a smart card for directly transferring money data into an identical card . To this end, it comprises a housing, a power supply, a microprocessor, memories, a numeric keypad, screens for displaying the sums concerned, and two complementary electrical connectors. When the two cards are coupled together, data transfer takes place by displaying the sum concerned, and then debiting said sum from the transmitting card and crediting it in the receiving card . That type of card cannot be used for interchanging data by simultaneous both-way copying between two individuals. Furthermore, at any one time, it can only apply to two individuals, whereas rapid interchange of data between a plurality of people constitutes a highly desirable objective.

3. Identification of the Objects of the Invention

A first object of the invention is to provide a smart card for direct communication, i.e. enabling data to be interchanged by both-way copying between two individuals having similar, mutually compatible cards, and without passing via an intermediary.

A second object of the invention is to provide a smart card for direct communication that includes transmission and reception means adapted to the objectives of the card.

A third object of the invention is to provide a smart card including means for checking the feasibility of an interchange between two coupled-together cards.

A fourth object of the invention is to provide a smart card for direct communication enabling general data interchange to take place between a relatively large number of similar and mutually compatible cards.

A fifth object of the invention is to provide a smart card for direct communication, including means for identifying which card in a stack of coupled-together cards is the card preventing general interchange of data.

A sixth object of the invention is to provide an appliance for making use of a smart card for communications, which appliance is adapted firstly to transmit data read requests and data write, delete, or correction instructions to said card and to cause particular programs to be performed, and secondly, in the context of an extension of its basic functions, to serve as an interface between the card and an external computer system.

A seventh object of the invention is to provide a multi-purpose smart card for communication that is suitable for being configured in such a manner as to be able to perform operations corresponding to a plurality of different functions, when coupled either with another card of the same kind, or else with computer systems adapted to such operations. Such configuration should be performed by executing appropriate instructions as transmitted by the appliance for making use of the card.

SUMMARY OF THE INVENTION

According to the invention, a smart card for direct communication between two individuals and adapted to be coupled to a similar card for data interchange by both-way copying comprises:

a relatively rigid body having two main faces;

an electrical power source;

a microcontroller and memories;

operating and control software;

a pair of members respectively comprising a signal transmitter member and a signal receiver member; and a manual activator;

characterized in that:

the signal transmitter and receiver members are disposed on the same main face of the card in such a manner that a both-way link can be established between two coupled-together cards;

the card includes a personal data memory and an acquired data memory; and the control software includes means for copying personal data from one card into the acquired data memory of the other.

According to an additional characteristic, the control software includes means for determining the feasibility of an operation, comprising:

means for determining the occupied volumes P in the personal data memories that are to be copied and the available volumes Q in the acquired data memories;

means for producing a feasibility signal concerning the intended both-way operation whenever the volume Q of one card is greater than the volume P of the other; and means for triggering the both-way copying operation in response to said feasibility signal.

According to another characteristic additional to the above, the control software memory contains the functional characteristics of the card and the control software comprises:

means for determining the level of compatibility between the functional characteristics of the coupled-together cards;

means for producing a general feasibility signal, including a communications protocol deduced from said level of compatibility, whenever such a level exists, and the conditions Q>P are satisfied for the coupled-together cards; and means for triggering the both-way copying operation in response to said general feasibility signal.

According to another characteristic additional to the above, the smart communications card includes at least one perceptible signal generator, for delivering sound and/or light, and the control software for the generator comprises:

means for causing at least one determined perceptible, sound and/or light, signal to be produced when the operation of data interchange by both-way copying has been performed; and means for causing another, but similar determined perceptible signal to be produced when it has not been possible to observe that the operation is feasible.

By means of these dispositions, the data contained in the respective personal data memories of two smart cards of the invention for direct communication can easily be interchanged by both-way copying. To this end, compatibility between two coupled-together cards and the capacity of each of them for copying the data from the other are initially verified. An interchange causes the personal data of each card to be copied into the acquired data memory of the other. At least one perceptible code signal, based on sound and/or light, is then produced indicting that the operation has been properly completed. If the operation is impossible for any reason whatsoever, then other perceptible code signals are produced to identify the cause.

It may be observed that the characteristics of the invention as specified above are cumulative. The theoretical minimum characteristics of a smart card of the invention do not include means for verifying the feasibility of the operation or any means for indicating that it has been performed successfully. Under such circumstances (not very commercial, but nevertheless conceivable), proper performance of the operation can nevertheless be verified by means of the appliance for making use of the card, as described below.

As a result, a smart card of the invention including all of the above-described characteristics is capable, in an advantageous application, of constituting an intelligent calling card for professional or club purposes in which it is extremely easy for the holders to copy the contents from the cards of their partners and of the people they meet. In this respect, it should be observed at this point that the contents of such intelligent calling cards could naturally include much more information than that which can be printed on a conventional calling card (four pages of text with figures being a good example of the quantity of information that could usually be involved).

The nature of the various components in a communications card of the invention is not specified in its definition. In this respect, the following may be observed. The body of the card is preferably a plastics plate or card that is more or less thick and stiff, and that has the format of a bank card. The manual activators will be circuits including a component that is sensitive to finger pressure, such as a field effect transistor, a variable electrical resistance, or a miniature membrane contact. The signal transmitter and receiver members providing coupling between contiguous cards may be of various types: electromechanical (two conductive tabs, one having a spike and the other not), inductive (two spiral coils), capacitive (two capacitor plates), acoustic (two piezoelectric elements), or optical (two diodes, one a light-emitting diode and the other a photo-receiving diode). The perceptible signal generators may be of the optical type (light-emitting diodes of different colors appearing in the edge of the card), or acoustic (a piezoelectric buzzer installed at the front of the card, i.e. its face that has the manual activator). With electromechanical or optical transmitter or receiver members, which may be very small in size, it is possible to make multiple connection members suitable for transmitting or receiving all eight bits of a byte simultaneously. One of the forms that could be assumed by a multiple electromechanical transmitter/receiver member would be that of the standardized connector member that is specified for bank cards complying with the standard ISO 7810. The personal data memory preferably comprises a zone of non-modifiable data that is loaded in the factory and a zone of modifiable data, in particular data that can be modified by the appliance for making use of the card and that the card holder possesses.

In general, the microcontroller used will be an assembly comprising one or more computer chips including at least one microprocessor and peripherals for handling memories and inputs/outputs. Examples of such microcontrollers available in 1994 include components sold respectively by the Japanese company EPSON and by the American company MOTOROLA under the references CARD-386 and MC 68 HC 11.

According to another characteristic of the invention, a smart card of the above-described kind adapted to interchanging data between more than two individuals comprises:

- on each main face, a respective manual activator and a respective pair of signal transmitter and receiver members, said members being disposed in such a manner that when the cards are stacked together a both-way link can be established between each pair of contiguous cards;
- a data-in-transit memory associated with the acquired data memory;
- means for puffing the card temporarily into an operative state in response to manual action exerted on at least one of the activators; and
- faces respectively referred to as "front" and "back" such that, in an ordered stack of cards, the accessible front face is that of the first card in the stack and the accessible back face is that of the last card in the stack, the activator of the first card being suitable for triggering the implementation of means for determining the feasibility of the operation.

According to additional characteristics, the procedure for verifying the feasibility of a general data interchange operation between the cards in an ordered stack of more than two cards comprises two complementary test stages, a down stage going down from the first card and an up stage going up from the last. The procedure is comparable to that implemented between two coupled-together cards, as briefly outlined above. It serves firstly to verify that all of the cards in the stack are compatible, and to determine the best communications protocol common to all of the cards by comparing the functional characteristics of all of the cards, and secondly to verify that the volume Q available in the acquired data memory of each card is greater than the sum of the volumes P occupied in the personal data memories of the other cards.

Similarly, the data interchange procedure between two or more than two cards comprises two successive copying stages: the first stage being a down stage from the first card and the second stage being an up stage from the last card, both implementing means similar to those used in cards that provide communication between only two people.

Under such conditions, when three smart cards of the invention for direct communication have been put into operation and properly stacked and coupled together, manual pressure applied to the front activator of the first card causes a general trigger signal to be produced which causes two successive procedures to be run: the first for verifying the feasibility of the intended operation and the second for interchanging data. When the verification in question is satisfactory, then the personal data contained in the first card is called and formatted for communication purposes, and is then applied to the transmission module of the transmitter on its back for transmitting to the receiver on the front of the second card.

The second card then proceeds to perform three operations: 1) it immediately transmits the formatted data received in this way to a buffer memory disposed upstream from the transmission module of the transmitter on its back for onward transmission to the receiver on the front of the third card; 2) it applies the formatted data received in this way to its own data-in-transit memory; and 3) it communicates its own personal data to the third card in the same manner as described for the first. The third card then applies both batches of formatted data that have reached it during this down communication procedure to its data-in-transit memory. Since this card is the last card in the stack and, as a result, its back manual activator is in the active state, the above operation has the additional effect of producing a second copy instruction causing an up communication procedure to begin, which is symmetrical to the down communication procedure described above.

Under such conditions, at the end of this both-way communication procedure, each card in the stack has stored in its data-in-transit memory batches of personal data coming from the other two cards. At this moment, a reconditioning operation can begin in which the personal data from the other cards as contained in the data-in-transit memories is put away and stored in the acquired data memories. To this end, the first card of the stack which has just received the batches of up messages and whose front activator is in the active state produces a load instruction for the acquired data memories that is immediately relayed to the other two cards. Since the back activator of the last card of the stack is also in the active state when the received instruction is performed, this last card emits a sound or light code signal indicating that all of the operations have been completed.

The user can then separate the stacked cards, returning each to its own participant, given that the name of the holder is inscribed in the clear on the front of each card. The process can naturally be implemented using only two cards, or on the contrary, with a larger number of cards (e.g. ten) stacked together in the same ordered stack. Under such circumstances, the time required for all of the operations will be several seconds, assuming batches of personal data each corresponding to a page of A4 format text.

By means of these dispositions, a smart card of the invention for direct communication makes it possible for a relatively large number of participants to interchange relatively large quantities of written data in digital form in relatively fast manner, without requiring the use of any external computer system.

In an additional aspect of the invention, a smart card of one of the above described types is associated with a pocket computer adapted to constitute an appliance for making use of the card, the assembly being characterized in that:

- the data memories of the card include batches of data identified by a series of determined labels;
- the control software of the card includes particular applications programs identified by another series of determined labels;
- the software of the appliance includes means for allocating one or more of the particular applications programs to at least one determined batch of data contained in the card in order to enable it to participate in the operations performed, in the context of special functions defined by said applications programs and in association with other similar cards and/or external computer systems adapted for this purpose.

By means of these dispositions, a smart card of the invention for communication and containing batches of data labeled "normally available" or "normally confidential" can be programmed at will from the appliance for making use thereof so that on first coupling with a similar card after such special programming, certain normally available batches are unavailable and thus not interchanged and/or certain normally confidential batches are no longer confidential and as a result, exceptionally, can be interchanged.

In addition, when the smart card of the invention for communication is inserted in an external computer system adapted to make use of the card, such a card, when appropriately programmed by means of the usual appliance for making use thereof, becomes a multipurpose card also capable of participating in most of the operations that are performed by means of the known smart cards described above. By way of example, one of the batches of data labeled "normally confidential" could be constituted by prepurchased telephone or money units that can be debited after being made accessible to an external computer system adapted for that purpose.

Also, since all microcomputers include an electrical connector to make a connection with an external computer system, first it is easy to recondition not only the control software of the card but also the contents of its modifiable personal data memories, and second to connect the card to a computer system for making use of its acquired data.

In this respect, it may be observed that such a connection makes it possible for the batches of data that have been collected during a seminar, an exhibition, or some other meeting to be transferred or copied in digital form automatically into an external computer system. This possibility is a considerable advantage over the tedious business of classifying, putting away, and/or keyboarding manually as is presently necessary for making good use of the tens of professional calling cards or club or association membership cards that are picked up during such meetings. It should also be observed that it is easy to use the appliance as an interface to a standard microcomputer for the purpose of loading personal data of the holder and control software for the card into the modifiable memory zones of the card.

BRIEF DESCRIPTION OF THE DRAWINGS

The characteristics and advantages of the invention appear in greater detail from the following descriptions of two embodiments of a smart card for direct communications, given as non-limiting examples, and described with reference to the accompanying drawings, in which:

FIGS. 1, 1a and 1b are simplified diagrams of the front and the back of a smart card for direct communication between two individuals;

FIG. 2 shows means for puffing the smart card of FIG. 1 into operation;

FIGS. 3a and 3b are simplified diagrams of the front and the back of a smart card for direct communication between a plurality of individuals;

FIGS. 4a, 4b, and 4c are three longitudinal sections through the card of FIG. 3;

FIGS. 6a and 6b show transmission and reception modules of smart cards of the invention;

FIG. 7 shows a frame of a message interchanged between two cards;

FIGS. 15a and 15b are block diagrams showing means enabling the card of the invention to adapt to a plurality of functions in response to instructions issued by the appliance for making use thereof.

DESCRIPTION OF THE INVENTION

Figure 5:
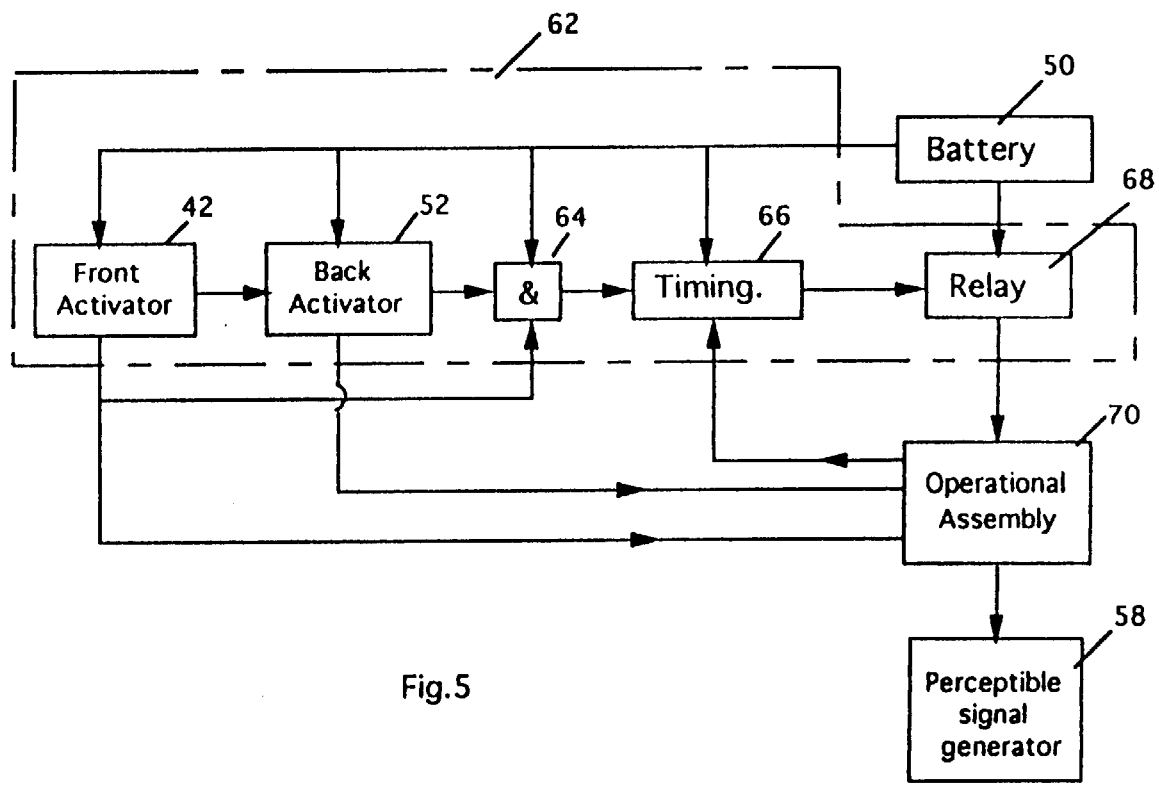
FIG. 5 shows means for putting the card of FIG. 3 into operation.

In FIGS. 1a and 1b, a smart card 10 for direct communication between two individuals comprises a medium constituted by a stiff plate of a format identical to that of bank cards and being substantially three times as thick (2.5 mm). This particular embodiment is given by way of a non-limiting example. It is determined by the minimum thicknesses of electronic and electrical components that were available on the market at the end of 1993. An activator 12 and a sound generator 24 are disposed on the back of the card 10 (FIG. 1a), and a transmitter member 14 and a receiver member 16 are disposed on the front thereof. Inside there is a relatively rigid sheet 18 carrying integrated circuits and two rechargeable electric batteries 20a and 20b, each providing 1.5 volts, and connected in series. Two conductive tabs 22a and 22b disposed on the back of the card (FIG. 1b) are connected to the outer terminals of the batteries 20. The manual activator 12 is an electrical circuit, e.g. comprising a field effect transistor that switches to the conductive state when the user puts a finger on it. By way of example, the transmitter and receiver members 14 and 16 may be of the inductive type, each comprising a spiral coil printed on an insulating medium. The front of the card 10 bears an inscription 26 identifying the holder of the card.

In FIG. 2, the smart card of the invention is put into operation by means of a set of circuits 28 that are continuously powered by the battery 20 and comprising the activator 12 and a switch 30 connected in series between the battery 20 and the power supply terminal of the operational assembly 32 which comprises a microcontroller, memories, logic stages, and analog stages. The card 10 continues to operate so long as the manual activator 12 is in the active state.

In FIGS. 3a–3b and 4a–4b–4c, a smart card 40 for direct communication between a plurality of individuals (e.g. two to twelve) is of identical dimensions to the card 10 of FIG. 1. On the front of the card 40 (FIG. 3a) there are disposed a manual activator 42, a transmitter 44, and a receiver 46, and on its back (FIG. 3b) there are disposed a manual activator 52, a transmitter 54, a receiver 56, a sound generator 58, and two conductive tabs 60a and 60b. Inside, the card 40 has a relatively rigid sheet 48 carrying integrated circuits and two batteries 50a and 50b connected in series. The positions of the two pairs of transmitters and receivers on the front and the back of the card 40 are interchanged so that in an ordered stack of the cards, a back transmitter 54 faces a front receiver 46, and vice versa. The activators 42–52, the transmitters 46–56, the receivers 44–54, and the batteries 50 of the card 40 are respectively identical to the activator 12, the transmitter 16, the receiver 14, and the batteries 20 of the card 10. Two indicator lamps 59a and 59b, e.g. one red and one green, are visible on the edge of the card.

In FIG. 5, the means for starting the smart card 40 comprise an assembly 62 of circuits that are continuously powered by the battery 50, including the front and back activators 42–52 connected to two inputs of an AND gate 64, and a timing circuit 66 followed by a relay 68 connected in series between the battery 50 and the operating circuit assembly 70 of the card 40. The time during which the timing circuit 66 operates (e.g. 60 seconds to 120 seconds) is controlled by the microcontroller included in the assembly 70, to which the activators 42–52 are also connected directly. As soon as the card has been started, the microcontroller causes the sound signal generator 58 to emit a signal.

FIGS. 6a–6b show the transmission and reception modules of a smart card 10 or 40, together with the appliance for making use thereof. In FIG. 6a, the transmission module 100 of such a card or such an appliance is functionally disposed between a data memory 102 and the input stage 104 of a transmitter member 14 (or 44–54). The transmission module 100 comprises two basic logic stages 106 and 108, and if a check is made that messages have been received properly, four additional stages 107–109–110–111. The function of logic stage 106 is to call the data contained in the memory concerned 102 in response to an appropriate external trigger signal SDE or a following frame signal STS for which the various possible origins are described in detail below. Logic stage 108 has the function of responding to the data called in this way by generating formatted message frames for traveling over a communications bus. This stage 108 is connected to the input stage 104 of the transmitter member concerned, the function of the stage 104 being to apply current amplification to the signals produced by the stage 108 and to apply them to the transmitter member 14 or 44–54.

The function of the logic stage 110 is to produce a positive acknowledge message MAP or a negative acknowledge message MAN in response to correct frame signals STC or incorrect frame signals STI produced by the reception module 126. The acknowledge messages produced in this way are applied to the logic stage 108 which transforms them into formatted frames. Logic stage 107 is a transmit buffer memory associated with logic stage 108 for the purpose of temporarily storing the most recently transmitted frame. Retransmission logic stage 109 is connected to stage 107 and is adapted to apply the frame stored in the buffer memory 107 to the input stage 104 of the transmitter member 14 in response to a retransmit request signal DRT produced either by the reception module 126 or else by a timing stage 111. The stage 111 produces a DRT signal when the time interval between two successive frames exceeds a determined duration, meaning that there has been an instantaneous interruption in the both-way link established between two coupled-together cards.

FIG. 7 represents a message frame as generated by logic stage 108. Each frame (except, in general, the last frame) comprises a fixed number of bytes (e.g. 64). The rate at which bits are transmitted preferably lies in the range 0.1 megabits per second (Mb/s) to 1 Mb/s. Each frame includes two standard fields, namely a header field 114 and a tail field 116, plus a data field 118, an ID field 122 for identifying the nature of the data in the message, and a position field 124 for indicating the position of the frame in the message (e.g. first, last, or intermediate). When maximum reception security is sought, each frame also includes a check field 120.

In FIG. 6b, the reception module 126 of a smart card 10 or 40 comprises three basic logic stages 128–136–138 functionally disposed between the output stage 140 of a receiver member (or 46–56) and various user stages 142, and if a check is made for proper reception, four additional stages 130–131–132–134 and a message interpreting stage 143. Logic stage 128 is a buffer memory adapted for storing at least one received message frame. Logic stage 130 serves to compute the check field of the frame stored in this way by applying an appropriate algorithm thereto. The function of logic stage 132 is to compare the check field included in the frame in question with that computed from the contents of the frame. When the two check fields are identical, then logic stage 132 issues a correct frame signal STC, and otherwise it issues an incorrect frame signal STI. The signal STC is applied to control a link stage 134 functionally disposed between the buffer memory 128 and two logic stages 136 and 138. Stage 136 is adapted to analyze the ID field 122 of each received message frame, and the second logic stage 138 is adapted to operate as a function of the result of said analysis, in order to dispatch each frame to various user stages 142 or to the interpreting stage 143 included in the card. The correct frame signal STC is also applied to a filter logic stage 131 that also receives a binary frame nature signal SNT produced by the message ID stage 136, specifying whether the frame belongs to a data message to be copied or to an acknowledge message. In response to these two signals, the filter stage 131 is adapted to produce a correct frame signal STC, whenever the frame nature signal SNT indicates a data message frame to be copied, and to inhibit said signal STC whenever the message is a positive or negative acknowledge message MAP or MAN.

The correct frame signal STC produced in this way by the filter stage 131 and the incorrect frame signal STI produced by the comparator stage 132 are applied to the inputs of the stage 110 for producing positive and negative acknowledgment messages MAP and MAN. When the ID stage 136 of the reception module 126 recognizes that the received message frame is a positive or negative acknowledgment message frame MAP or MAN, then the dispatcher stage 138 directs it to the message interpreter stage 143. In response to a positive message MAP, the stage 143 produces a following frame trigger signal STS and applies it to the calling logic stage 106 of the transmission module 100. In response to a negative message MAN, the stage 143 produces a frame retransmission request signal DRT which is applied to control the stage 109. The signal DRT is also applied to the count input of a counter stage 133, and the signal STS is applied to the clear input of the counter stage. The counter stage 133 is adapted to produce an output signal when the number of counted DRT signals exceeds a determined threshold. This means that frame retransmission has been ineffective and therefore that there is a break in the link between two coupled-together cards. The output signal is applied to control the perceptible signal generator 24 or 58.

The check field 120 of each frame and the logic stages 107–109–110–111 of the transmission module 100, together with the stages 131–132–133–134–143 of the reception module 126 that make use of the check field may be omitted if there are no disturbances that could interfere with the transmitter and/or receiver members of the card. This applies in particular when the transmitter/receiver members are electromechanical or optical.

The transmission and reception modules 100 and 126 are subassemblies of the control software of the card 10 which is contained in a memory 146 and which is implemented by a microcontroller 144.

Figure 8:
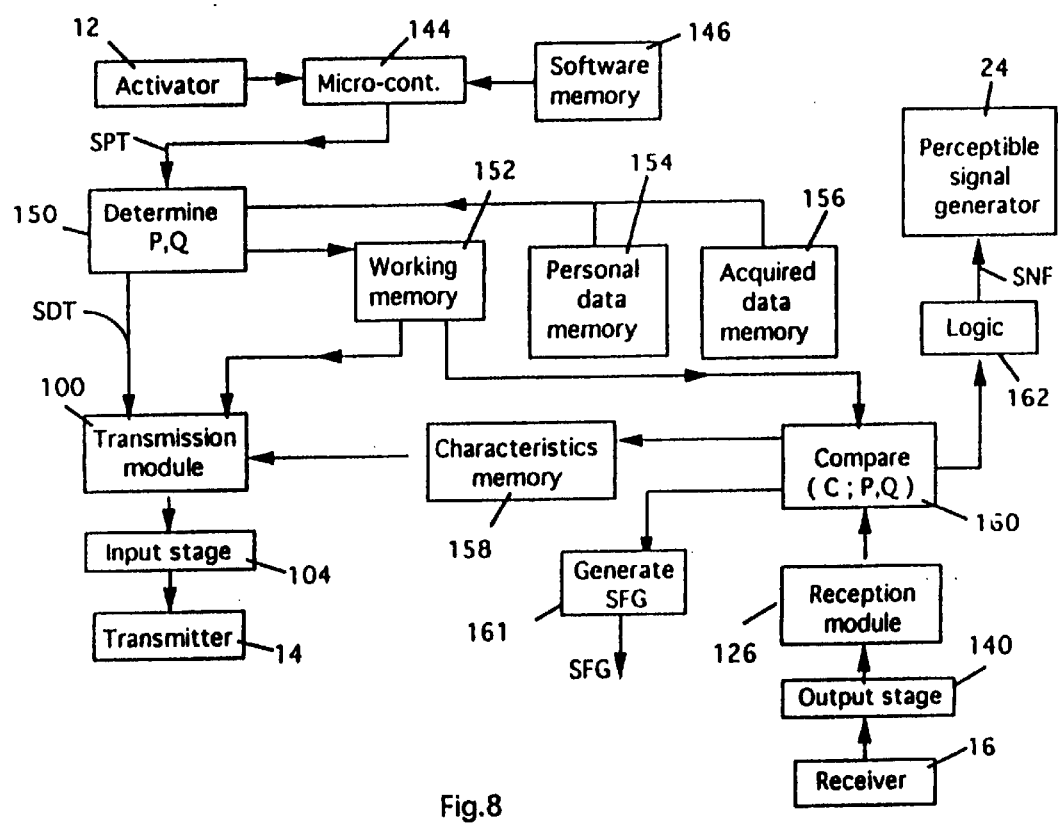
FIG. 8 is a block diagram of software for verifying the feasibility of a data interchange operation between two cards of FIG. 1.

In FIG. 8 which is a block diagram of the means for verifying the feasibility of a data interchange operation between two smart cards of FIG. 1, a first effect of manual action on the activator 12 of each card is to put them into an active state, and thereafter to cause the microcontroller 144 of each of them to produce a prepare-for-test signal SPT which is applied to a logic stage 150. The logic stage 150 of each card is adapted to respond to the signal SPT by interrogating the personal data memory 154 and the acquired data memory 156 to determine the volume P occupied in the memory by personal data 154 and the volume Q available in the memory for acquired data 156, and then to apply these data items P and Q to a working memory 152.

When this operation has been completed, logic stage 150 delivers a test trigger signal SDT to the transmission module 100. In response to this trigger signal SDT, the transmission module 100 of each card calls one of the data items P or Q stored in its working memory 1 52 together with at least one of its operating characteristics stored in a memory 158 that must necessarily be known by the other card if it is to perform the intended data interchange operation. These static operational characteristics include a definition of the application concerned, and when a plurality of successive versions of the card exist on the market, a definition of the communications protocol used by the card. In this respect, it may be observed that the communications protocol of the first version of a communications card of the invention is naturally compatible with that of later versions, each new protocol including earlier protocol(s) as lower-grade protocol(s).

The data called in this way by the transmission module 100 of each card is processed as described with reference to FIG. 6a, and finally a test message containing the data is applied as a control signal to the input stage 104 of the transmitter member 14 of each card. Consequently, the output stage 140 of the receiver member 16 of each card reproduces the test message that the other card has transmitted thereto. This test message is applied to the reception module 126 which identifies it as such and therefore appliers it to a comparator logic stage 160. The stage 160 also receives the data stored in 158, as transmitted by the transmission module 100, and the data items P and Q stored in 152 and not transmitted by the module 100. The comparator logic stage 160 is adapted to produce an output signal whenever: 1) the definitions of the applications in the two cards are identical; 2) a common communications protocol Cc has been found between the two cards; and 3) data item Q in each of them is greater than item P in the other. This output signal is applied to a logic stage 161 adapted to produce a general feasibility signal SFG for use by logic stages that are described below. This signal SFG contains a definition of the communications protocol Cc that is common to the two coupled-together cards.

Figure 9:
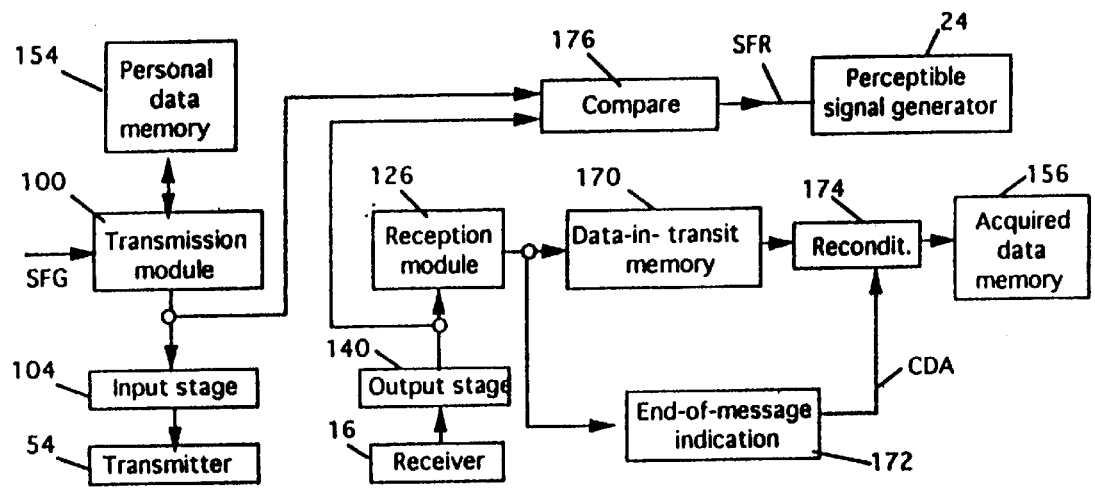
FIG. 9 shows the functional stages of two cards of FIG. 1 while performing a data copying operation.

In FIG. 9, which is a block diagram of the means implemented during data interchange between two cards of FIG. 1, the general feasibility signal SFG produced by logic stage 161 of FIG. 8 is applied as a trigger signal to the transmission module 100. The module 100 responds by calling the data contained in the personal data memory 154 and transforming said data into a message for copying which is applied as a control signal to the input stage 104 of the transmitter member 14. In the coupled card, the output stage 140 of the receiver coil 16 reproduces the message as transmitted in this way and applies it to the reception module 126. This module recognizes the ID field 122 of the received message and accordingly applies the message to a memory 170 for data in transmit and also to a logic stage 172 which is adapted to detect the end of the received message in the position-indicating field 124 of the last frame of the message. Once this detection has occurred, a load instruction CDA for the acquired data memory 156 is produced and applied to a logic stage 174 which is adapted to recondition the formatted data contained in the memory 170 for data in transit and transfers said data into the acquired data memory 156. It may be observed that the transfer will be real or virtual depending on whether the memory zones allocated to the data in transit 170 and to the acquired data 156 differ in location or merely in description. Also, the message produced by the transmission module and that produced by the output stage 140 of the receiver 16 are applied to a comparator logic stage 170. The stage 176 is applied to detect the instants at which the transmitted and the received messages end, on the basis of the position fields 124 marking the last frames of said messages, and to produce an end of reception signal SFR when the end of the received message appears after the end of transmitted message. The signal SFR (e.g. a special run of longs and shorts) indicating that the operation has ended well, is applied as a control to the sound signal generator 24 of one of the two coupled-together cards, with the particular card being selected by some arbitrary selection criterion.

Figure 10A:
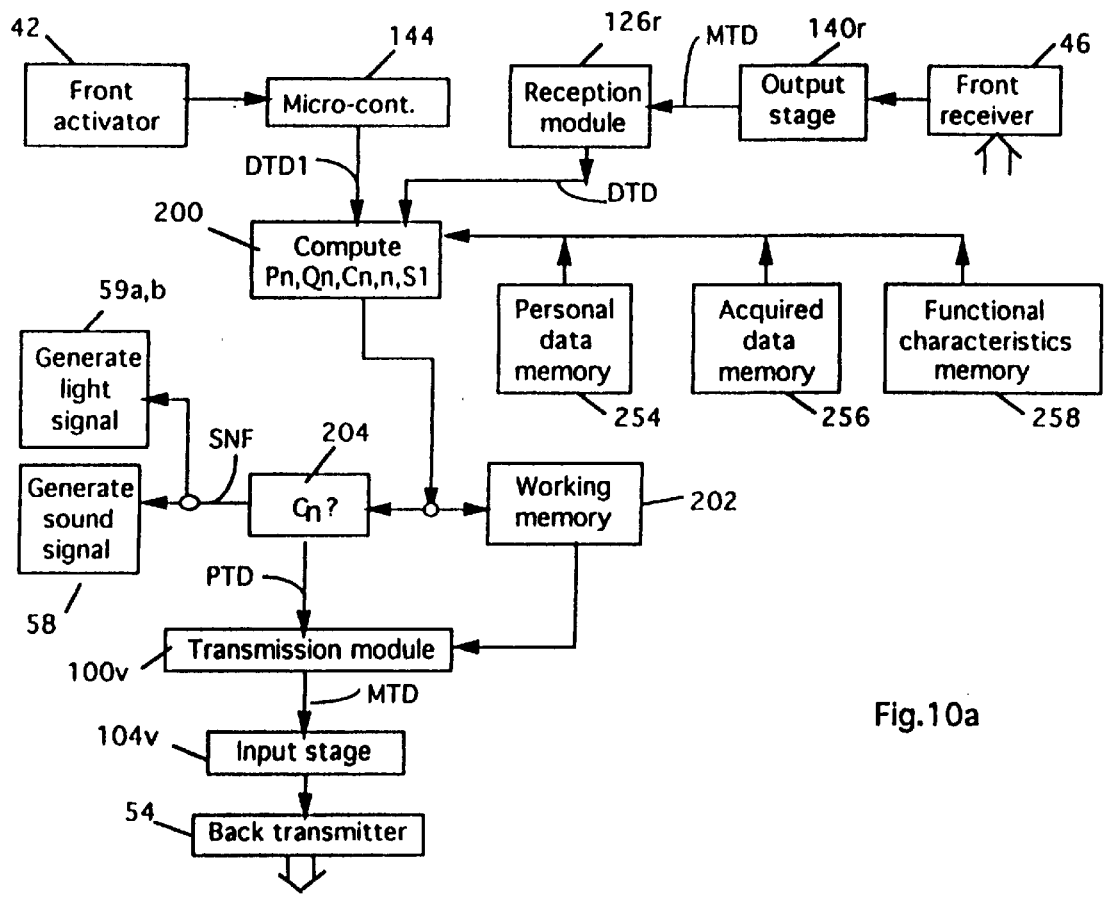
FIGS. 10a and 10b are block diagrams showing the software for verifying the feasibility of a general data interchange operation between a plurality of cards of FIG. 3, forming a portion of an ordered stack.
Figure 10B:
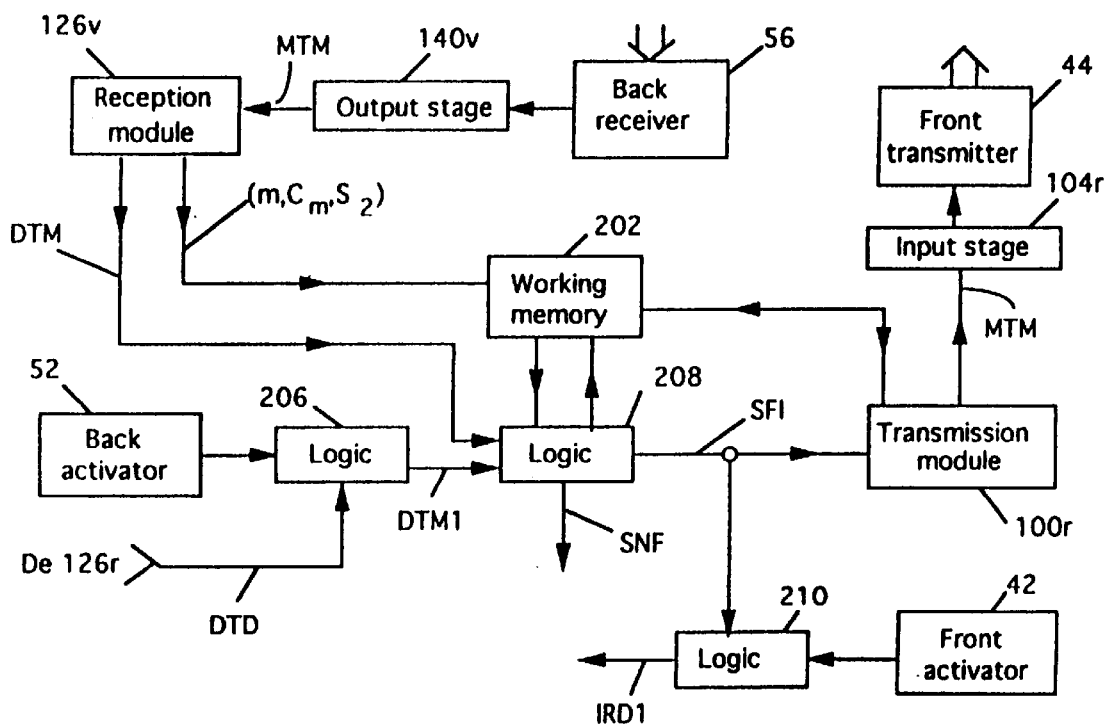

FIGS. 10a–10b show two portions of the operating diagram for the means that, prior to starting operations, verify feasibility of a general data interchange between a plurality of cards as shown in FIG. 3. In FIG. 10a, an initial down test trigger signal DTD1 starts the operation. This signal DTD1 is produced by the microcontroller 144 in response to manual action on the front activator 42 of the card constituting the first card in a stack, or otherwise by the reception module 126r associated with the output stage 140r of the front receiver 46. In the first case, the signal DTD1 contains only computation instructions for the logic stage 200 to which it is applied. In the second case, a down test trigger signal DTD is included in a down test message MTD which also includes the rank n–1 of the preceding card and the static functional characteristics Cn–1 common to the n–1 preceding cards. In response to the signal DTD, logic stage 200 is adapted: 1) to increment the rank n–1 of the preceding card by unity; 2) to interrogate the memories 254, 256, and 258 of the card of rank n; 3) to compute the volume Pn occupied in the personal data memory 254, the volume Qn available in the acquired data memory 256, the memory 258 for data Cn concerning the static functional characteristics common to the card concerned and to the n–1 cards disposed above it, and the data S1 representing the sum of the data P of the n–1 cards; and 4) to apply the data Pn, Qn, Cn, n, and S1 to a working memory 202.

The determination of the common characteristics Cn includes a prior step: that of verifying that the application of the first card is to be found in each of the other cards. In addition, the computation stage 200 is connected to a logic stage 204 adapted to produce two signals, the first signal being a continue down test signal PDT whenever it has been possible to obtain a data item Cn, and the second signal being a non-feasibility signal SNF whenever it has been impossible to find any common characteristic Cn between the card concerned of rank n and the n–1 preceding cards. The signal SNF is encoded and applied as a control signal to the sound signal generator 58 and to the two different-color indicator lamps 59a–59b. The presence of a card that is not capable of participating in the interchange is indicated by the sound generator, and the particular card is immediately identified by its two indicator lamps. As a result, a deficient card can quickly be removed so as to enable the general data interchange operation to continue with the other cards.

The continue down test signal PTD is applied as a trigger signal to transmission module 100v which responds by generating a new down test message MTD comprising a down test signal STD together with all of the data stored in the working memory 200, and this is applied to the input stage 104*v* of the back transmitter 54. The output stage 140*r* of the front receiver 46 of the following card of rank n+1 reproduces the down test message MDT and its reception module 126*r* extracts therefrom a down test trigger signal DTD for the card of rank n+2.

In FIG. 10*b*, when the last card of rank m in the stack receives such a down test message, the signal DTD that it contains is applied to one of the two inputs of a logic stage 206 (that is inoperative for all of the other cards) whose other input is connected to the back activator 52. In this last card, the back activator 52 is in the active state and under such conditions the logic stage 206 transforms the received DTD signal into a first up test trigger signal DTM1 which contains operating instructions applied to a computing stage 208. In response to these instructions, the stage 208 of the last card determines whether the volume Qm available in its acquired data memory 256 is greater than the sum S1 of the volumes P occupied by the personal data in the m−1 cards disposed thereabove, as contained in the working memory 202. Thereafter, in all of the other cards, the stage 208 computes in addition the sum S2 of the data Pn for the card concerned plus the m-n data items P of the cards disposed beneath it. In the last card, this term S2=Pm. If such a data item Cm that is common to all of the cards is obtained, and if the value of the data item Qm is sufficient, then the logic stage 208 produces an individual feasibility signal SFI which is applied as a trigger signal to the transmission module 100*r*. This module 100*r* responds by calling the data contained in the working memory 202 and it then generates an up test message MTM which contains the rank m of the last card, Cm, S2, and an up test trigger signal DTM. The up test message MTM is applied to the front transmitter member 44 via its input stage 104*r*. Otherwise, if it is not possible to obtain a data item Cm for the last card and/or if the data item Qm is too small to copy the sum S1 of the data P from the cards disposed thereabove, logic stage 208 produces a non-feasibility code signal SNF which is applied as a control signal to the sound signal generator 58 and to the two indicator lights 59*a*–59*b*, as mentioned above.

In each card that receives the up test message MTM, the reception module 126*v* connected to the output stage 140*v* of the back receiver 56 identifies the transmitted data items m, Cm, and S2 and applies them to the working memory 202. The logic stage 208 which receives the DTM signal of the message computes: 1) the sum S=S1+S2 of the data P from all of the other cards in the stack; and 2) the sum S2 of the data P belonging to the card in question and all of the instructions disposed thereabove. Once these computations have been performed, the logic stage 208 proceeds to perform the verifications described for the last card and, depending on circumstances, it either produces an individual feasibility signal SF1 or a non-feasibility signal SNF, which signals are made up and then made use of in the same manner as described above. When such a signal SFI is produced by the logic stage 208 of the first card in the stack, it is applied to one of the two inputs of a logic stage 210 (that is inoperative for all of the other cards) which receives on its other input the output from the front activator 42 and which responds by producing an initial down copy signal IRD1.

Figure 11A:
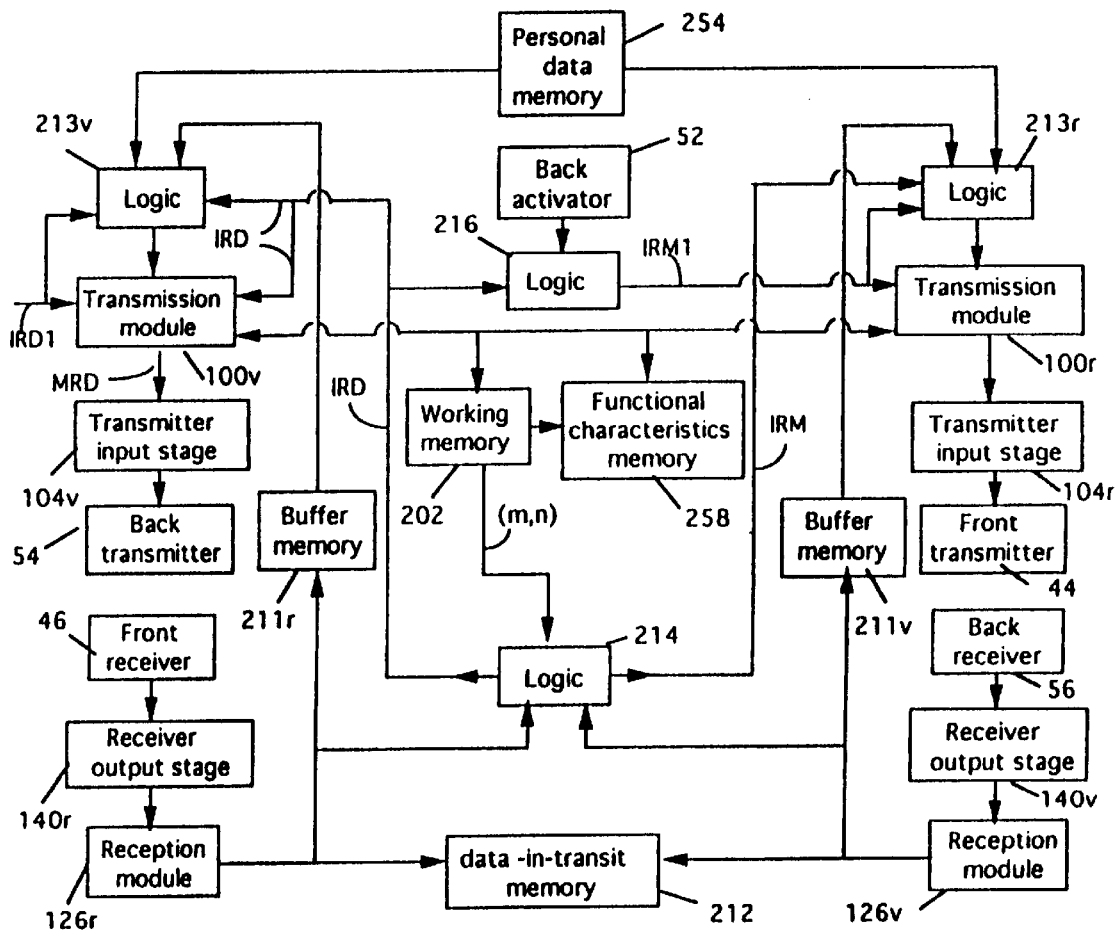
FIGS. 11a and 11b show the functional steps of the procedures for up and down copying of personal data from one card into the other card in a stack.
Figure 11B:
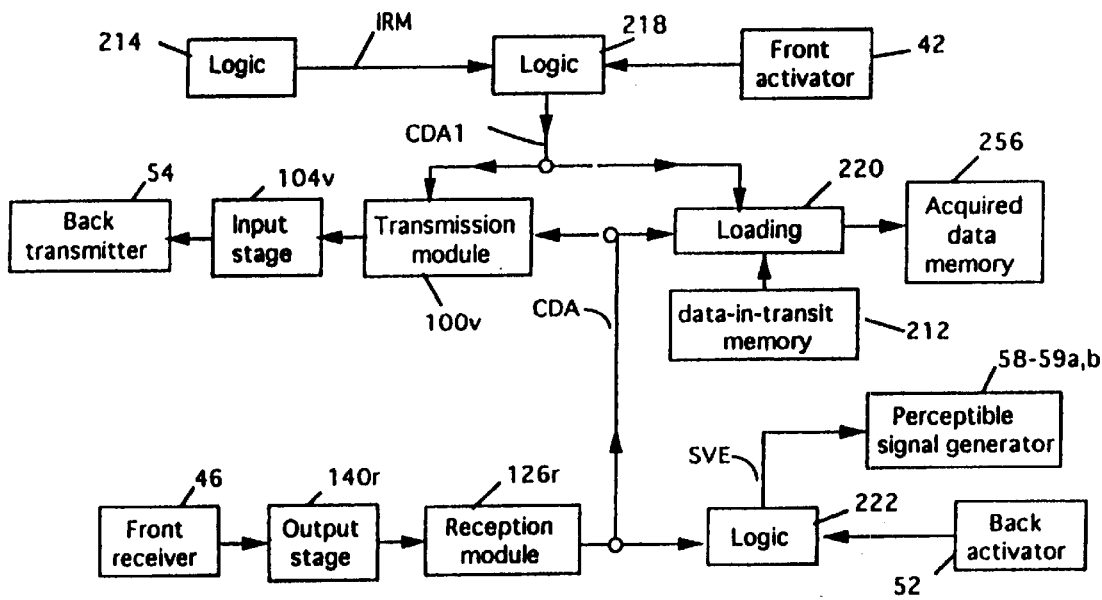

FIGS. 11*a* and 11*b* are functional block diagrams of the procedure for copying into the data-in-transit memory of a card the personal data coming from the other cards, and the procedure for transferring said data into the acquired data memory of the card. In FIG. 11*a*, the initial down copy instruction IRD1 is applied as a trigger signal to the transmission module 100*v* and to a switching logic stage 213*v* having one of its two inputs connected to the personal data memory 254 of the card. In response to an instruction IRD1 for the first card of the stack and to an instruction IRD for the others, the transmission module 100*v* calls the data contained in the personal data memory 254 and then, on the basis of said data and in agreement with the common communications protocol contained in the memory 258 for static data characteristic of the card, and as selected by the data item Cm contained in the working memory 202, it generates a down copy message MRD which is applied as a control signal to the input stage 104*v* of the back transmitter 54.

In the card contiguous with the first card, the reception module 126*r* connected to the output stage 140*r* of the front receiver 46 reproduces this copy message and applies it to the data-in-transit memory 212, to a buffer memory 211*r* disposed upstream from the logic stage 213*v* and from the transmission module 100*v*, and to a logic stage 214. The logic stage 214 is connected to the working memory 202 which contains the rank n of the card and the rank m of the last card in the stack. The stage 214 determines the number n−1 of messages to be received during the down copy procedure, and on the basis of this number and of the position indicator field 124 of the last frame of the last message to be received, it produces a down copy instruction. This instruction IRD is applied as a switching control signal to logic stage 213*v* and as a trigger signal to the transmission module 100*v*. So long as the logic stage 214 does not detect the position indicator field of the last frame of the last received message, the switching stage 213*v* applies the frames successively present in the buffer memory 211*r* to the transmission module 100*v*, which module applies them without change to the input stage 104*v* of the back transmitter module 54. In response to an IRD instruction, the logic stage 213*v* connects the personal data memory 254 of the card to the transmission module 100*v*. As a result, the incident message reaching the preceding cards is relayed to the following cards and is then extended by the data message relating to the card in question.

In the following card, the front receiver 46 receives a run of messages to be copied and the stage 214 detects the end indication concerning the last received message. The down copy process continues until the last card in the stack. This card therefore receives a run of messages made up of successive batches of personal data from all of the cards disposed above itself. If the rank of the last card is m, its transmit memory 212 contains m−1 batches of data while the transit memory of a card of rank n contains the n−1 batches from the cards that precede it. The end indication of the last message as applied to logic stage 214 of the last card in the stack is transformed into an IRD instruction applied to a logic stage 216 (inoperative in all the other cards) simultaneously with the active output from the back activator 52.

In response, this logic stage 216 produces an initial up copy instruction IRM1 which is applied as a trigger signal to its transmission module 100*r*. The module 100*r* connected to the front transmitter 44 of the last card operates in the same manner as the transmission module 100*v* connected to the back transmitter 54 of the first card in the stack. Once the first card has received the run of messages containing the batches of personal data from all of the cards, then the data in transit memory 212 in each card of the stack contains the batches of personal data from all of the other cards. During this up copy procedure, logic stage 214 produces IRM instructions after computing the number m n of messages to be received.

In FIG. 11b, logic stage 214 of the first card in the stack produces an IRM instruction which is applied to a logic stage 218 while the front activator 42 is simultaneously in the active state. In response, this logic stage produces an initial load instruction CDA1 for the acquired data memory 256 of the card in question. In the first card, this instruction CDA1 is applied to a reconditioning and loading station stage 220 adapted to call the batches of formatted data contained in the data-in-transit memory 212 and to apply them in reconditioned form to the acquired data memory 256. This operation is either real or virtual depending on whether the memory zones concerned, i.e. 212 or 256, differ in location or merely in description. In addition, this instruction CDA1 is applied as a control signal via the transmission module 100v to the input stage 104v of the back transmitter 54 of the first card. As a result, the CDA instruction is relayed from card to card. The reception module 126r connected to the front receiver 46 of each card concerned reproduces said CDA instruction and applies it to its own input stage 104v via the transmission module 100v, and directly to its own loading logic stage 220. The last card applies the CDA instruction to a logic stage 222 (that is inoperative in all of the other cards) simultaneously with an active output from the back activator 52. In response, the stage 222 produces an interchange enable code signal SVE which is applied as a control signal to the sound and light generators 58–59a–59b of the last card, with the sound generator 58 drawing the user's attention and with the indicator lights 59a–59b informing the user that interchange has been enabled.

Figure 12:
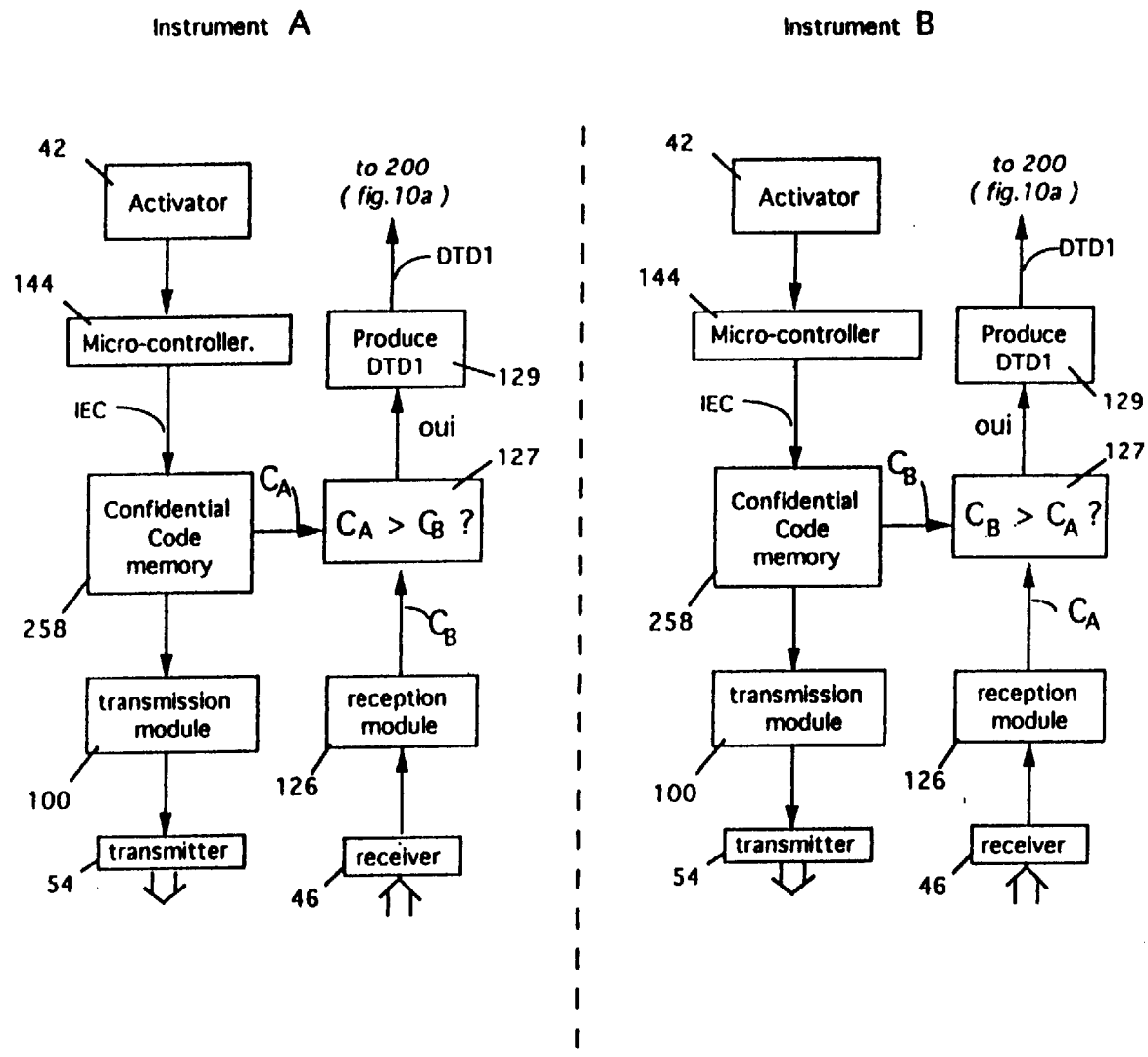
FIG. 12 is a block diagram showing the preliminary logic stages to be implemented in order to make use of a physical variant of the above-defined smart cards.

FIG. 12 shows the modifications that need to be made to the control software of the card of the invention for direct communication between a plurality of individuals when the card has only one manual activator. In FIG. 12, two extreme cards in a stack of cards that has already been put into operation are given references A and B. The single manual activator 42 disposed on one face of each extreme card is accessible. Putting said activator 42 into the active state has the effect of causing the microcontroller 144 to produce an instruction for sending a confidential access code IEC which is addressed to the memory 258 containing the functional characteristics of the card containing the code. As a first response, the memory 258 sends the code CA for the card A and the code CB for the card B to the transmission module 100 associated with the transmitter member 54 disposed on the other face of the card. The transmitter/receiver members of the other cards in the stack relay the message all the way to the receiver 46 of the other extreme card and thus to its reception module 126, which applies it to a comparator stage 127. As a second response to the IEC instruction, the memory 258 applies its access code CA or CB directly to said comparator stage 127. This stage 127 is adapted to determine whether the ten-digit number (for example) of the code transmitted directly by the memory 258 is greater than or less than the number constituted by the access code of the other extreme card as applied thereto by the reception module 126. In application thereof, stage 127 of card A performs the test CA>CB? while stage 127 of card B performs the test CB>CA?. A yes response is generated by only one of them. This response is applied to a logic stage 129 adapted to produce an initial down test trigger instruction DTD1 as described above which is addressed to the computation stage 200 (see FIG. 10a). The step of determining the feasibility of the operation then begins, exactly as described above.

Figure 13:
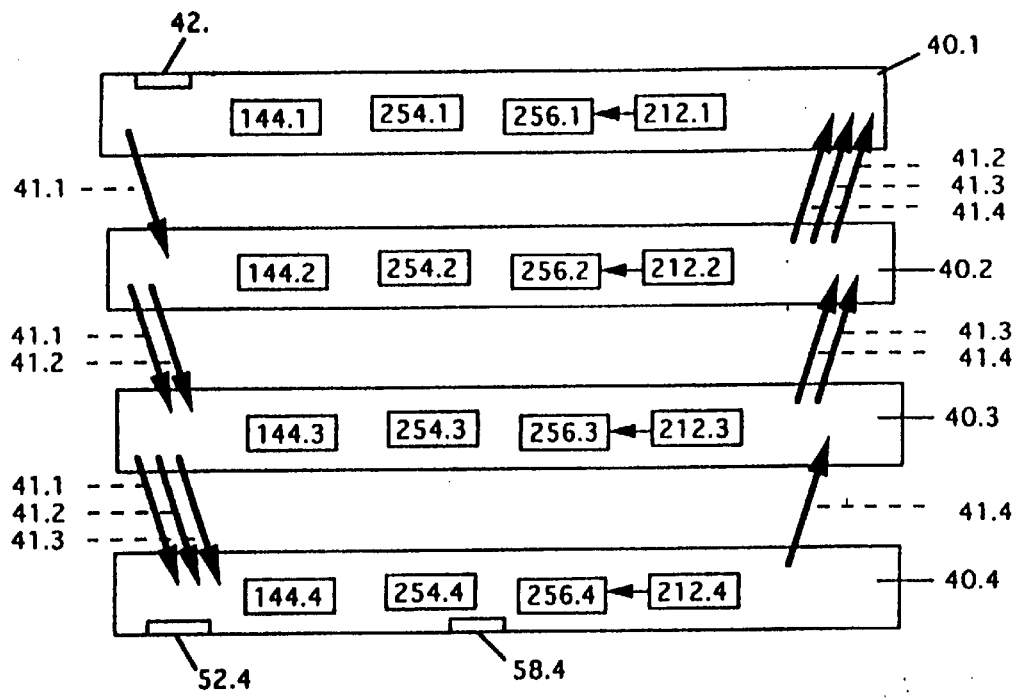
FIG. 13 is a diagram summarizing the steps of a general data interchange operation between four stacked cards.

FIG. 13 is a diagram summarizing the steps of a data interchange in a stack comprising four cards of the invention. From first to last, the cards are referenced 40.1, 40.2, 40.3, and 40.4. The front activator 42.1 of the first card 40.1 and the back activator 52.4 of the last card 40.4 are the only activators that are accessible and they are the only activators shown. The same applies to the sound generator 58.4 of the last card. Inside the cards 40.1, . . . , 40.4, there are shown diagrammatically the microcontrollers 144.1, . . . , 144.4, the personal data memories 254.1, . . . , 254.4, the data-in-transit memories 212.1, . . . , 212.4, and the acquired data memories 256.1, . . . , 256.4. The three down arrows 41.1 represent personal data from the transmitting card 40.1 communicated successively to the three cards 40.2, 40.3, 40.4 that receive this data. Similarly, the two down arrows 41.2 represent personal data from the transmitting card 40.2 as successively received by the two receiving cards 40.3 and 40.4. The same applies to down arrow 41.3 from transmitting card 40.3 to receiving card 40.4. Symmetrically, a similar reference is given to up arrow 41.4, and identical references are given to up arrows 41.3 and 41.2. When the personal data from the other cards has reached a given card, it is temporarily stored in the data-in-transit memory 212 of that card, and is then transferred into its acquired data memory 256, as explained in detail above.

FIGS. 15a and 15b show particular features of an assembly comprising a smart card of the invention for communication associated with the appliance for making use thereof which is constituted by a pocket microcomputer adapted for this purpose, and is therefore provided with compatible transmitter and receiver members and with appropriate control software. Said assembly is serving to prepare a card so as to make it capable for performing a plurality of different functions.

In FIG. 15a, the data memories 254 (in general personal data and where appropriate acquired data) include, by way of non-limiting example, three batches a, b, and c of data. The first batch a is stored in memory zone 254a and is labelled "normally confidential". It is made up of various kinds of descriptive data and it is intended for interchanging with particular third parties. The second batch b is stored in memory zone 254b and is labeled "normally available". It is constituted by data similar to the above and is intended for data interchanges with any interested person. The third batch c is stored in memory zone 254c and is labeled "normally confidential". It is constituted by prepaid telephone units, that are intended to be debited when the card is inserted in an appropriate telephone system. The memories 254a–254b are connected to computation stage 200 of FIG. 10a via switches 255a and 255b. The memory 254c is connected by a switch 255c to a debit control logic stage 257. These three switches 255a,b,c are placed under the control of the standard program for both-way copying that is included in the control software 156 of the microcontroller 144. Under such conditions, under the control of this standard program, the two switches 255a and 255c which are connected to respective memory zones 254a and 254c containing data that is labelled as "normally confidential" are permanently in the OFF state while, on the contrary, switch 255b which is connected to memory 254b containing data that is labelled as "normally available" is permanently in the ON state. As a result, in the absence of any explicit instruction to the contrary, only batch b of data stored in 254b can participate in the above-described both-way copying operations. In this case, the standard program causes the microcontroller 144 to produce the instruction DTD1 which is applied to computation stage 200 (see FIG. 10a). The three switches 255 a,b,c are also under the control of special programs for selecting batches and functions which are contained in a memory 259.

Figure 14:
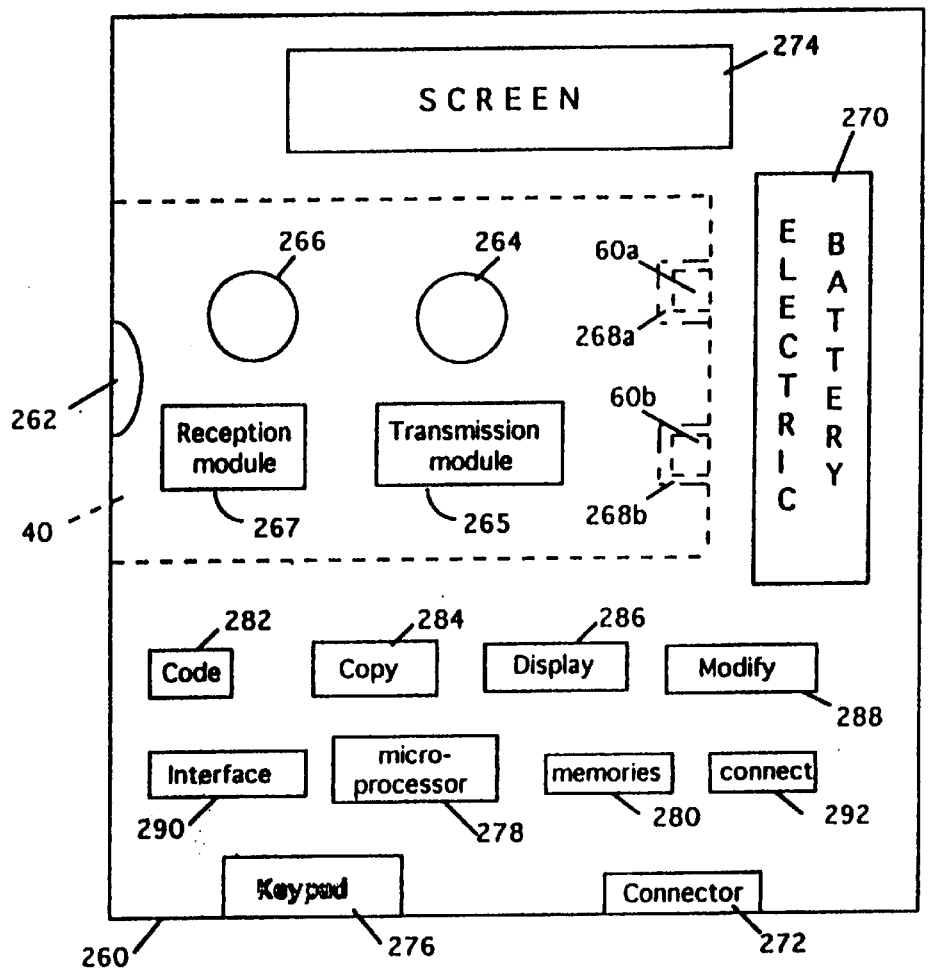
FIG. 14 is a schematic illustration of an appliance for making use of the smart card of this invention.

FIG. 14 schematically illustrates an appliance for making use of the smart card, while in FIG. 15b, the control software of the appliance 260 for making use of a card has four complementary stages: a stage 289 for "inverting normal links", a stage 291 for "specifying batches concerned", a stage 293 for "authorizing debit in batch c", and a stage 295 for "combining instructions". This stage 295 is adapted to produce a message which is applied to the transmission module 265 of the appliance 260. This message is received by the communication card installed in the appliance and the reception module 126 thereof applies it as an instruction to execute the special programs for selecting batches and functions as contained in 259.

By way of example, these special programs include a first function of inverting normal states, i.e. ON or OFF, as established by the standard program, for one and/or another of the three switches 255 a,b,c. The second function of these special programs, when the switch 255a is in fact in the ON state, is to allow the standard program to produce the DTD1 instruction causing data interchange to begin, and as a result to involve batch a of data stored in 254a in such an interchange even though it is labelled as "normally confidential", while it is exceptionally made available. The third function consists in temporarily making unavailable data batch b which is stored in 254b and is labelled as "normally available".

The fourth function of the special programs stored in 259 is to transform a card of the invention for direct communication between individuals into an instrument for payment. In this case, the data stored in 254a and 254b is prevented from being interchanged while the data stored in 254c is enabled for debiting purposes. To this end, the switches 255a and 255b are OFF while the switch 255c is switched ON. The debit control stage 257 is simultaneously made active. Under such conditions, when the communications card is programmed to be an instrument for payment of a telephone call, its reception module 126 receives instructions from the telephone system concerned to debit telephone units contained in memory zone 254c. These instructions are acted on by the debit program contained in the memory 257.

The invention is not limited to the embodiments described.

The various functional and software stages of the communications card of the invention have been described for explanatory purposes and naturally do not comprise practical embodiments of such stages. The coupling members between two adjacent cards or between a card and an appliance for making use thereof may be of various types, including electromechanical, inductive, capacitive, acoustic, and optical. When using electromechanical coupling members, the input stage of a transmitter member and the output stage of a receiver member are reduced to mere electrical connections.

Personal data memories preferably comprise two zones, one of which is not modifiable and is loaded by the manufacturer to contain stable data specific to the holder of the card (identity, . . . ) while the other is modifiable at the will of the user by means of an appliance for using the card and/or an external computer system.

The rechargeable battery of the card may be replaced by a battery that is not rechargeable in spite of the drawback of the periodic replacement required by such a component. Under such circumstances, the external conductive tabs of the card and the flexible contacts of the appliance for making use thereof can be omitted.

The above-mentioned applications of the smart communications card of the invention are not limited to intelligent calling cards as described nor to such cards adapted to constitute in addition an instrument for payment of telephone calls. Applications will be extended by market requirements.

We claim:

1. A smart card for direct data interchange between two or more individuals, said card being adapted to be coupled to several other cards of the same kind, in order to interchange data by both-way copying;

said card having two faces and comprising;

an electrical power source;

a micro-controller and memories;

an operating and control software stored in one of said memories;

a personal data memory and an acquired data memory;

on each of its two faces, a respective manual activator and a respective pair of signal transmitter and receiver members, said members being disposed in such a manner that when several cards are stacked together a two-way link can be established between each pair of contiguous cards;

means for putting the card temporarily into an operative state in response to manual action exerted on at least one of the activators;

said control software including:

means for determining the feasibility of an interchange data operation;

means for copying personnel data memories from the card into the acquired data of other cards of the stack;

said two faces respectively referred to as "front" and "back" such that, in an ordered stack of tools, the accessible front face is that of the first card in the stack and the accessible back face is that of the last card in the stack, the accessible activator of the first card of the stack being suitable for triggering the implementation of means for determining the feasibility of the operation and of means for interchanging personal data between all the cards.

2. A smart card for direct data interchange between two or more individuals, said card having two faces and comprising;

an electrical power source a micro-controller and memories;

an operating and control software stored in one of said memories;

a personal data memory and an acquired data memory;

a manual activator and a pair of signal transmitter and receiver members on one face and only one identical pair of transmitter and receiver members on the other face, the two pairs being disposed in such a manner that in a stack of cards a two-way link can be established between any pair of cards;

means for putting the card temporarily into an operating state in response to manual action on its activator;

said control software including:

means for determining the feasibility of an interchange data operation;

means for copying personnel data memories from the card into the acquired data of other cards of the stack; and means included in the control software for intervening during a preliminary step prior to any other operation to allocate respective first and last ranks to the extreme cards of a stack having manual activators accessible on said extreme cards so that the activator of the first card can act as an accessible front activator, thereby triggering implementation of the means for starting the first step of the intended data interchange operation, and the activator of the last card can act as an accessible back activator, thereby intervening as such in said operation.

3. A smart card according to one of the claims 1 or 2, including at least one perceptible signal generator, delivering sound and/or light, wherein the control software for said generator comprises:

means for causing at least one determined perceptible, sound and/or light signal to be produced when the operation of data interchange by both-way copying has been performed; and means for causing another determined perceptible signal to be produced when it has not been possible to observe that the operation is feasible.

4. A smart card according to the claim 1 or 2, wherein the feasibility verification means and the data copying means of the control software both comprise two successive stages:

a down-going stage from the first card, triggered by the manual activation of the accessible activator of the first card; and an up-going stage from the last card triggered by the manual activation of the accessible activator of the last card.

5. A smart card according to claim 4, wherein;

the feasibility verification means operate in order to check that the available volume of the acquired data memory of each card is larger than the total volume of the personal data memories of all the othere cards of said stack of cards;

said volumes of personal data memories being successively accumulated in a buffer memory during the down-going operation then during the up-going operation implemented under the control of said feasibility verification means.

* * * * *